United States Patent
Wakabayashi et al.

(10) Patent No.: US 9,447,298 B2
(45) Date of Patent: Sep. 20, 2016

(54) INK-JET PRINTING METHOD

(71) Applicant: KAO CORPORATION, Tokyo (JP)

(72) Inventors: Yuki Wakabayashi, Izumiotsu (JP);
Kaname Mitsuyoshi, Wakayama (JP);
Hiroto Soma, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 14/653,140

(22) PCT Filed: Dec. 10, 2013

(86) PCT No.: PCT/JP2013/083537
§ 371 (c)(1),
(2) Date: Jun. 17, 2015

(87) PCT Pub. No.: WO2014/098001
PCT Pub. Date: Jun. 26, 2014

(65) Prior Publication Data
US 2015/0337149 A1    Nov. 26, 2015

(30) Foreign Application Priority Data

Dec. 18, 2012  (JP) ................... 2012-276127

(51) Int. Cl.
*C09D 11/322* (2014.01)
*C09D 11/38* (2014.01)
*C08K 5/06* (2006.01)

(52) U.S. Cl.
CPC ............... *C09D 11/38* (2013.01); *C08K 5/06* (2013.01); *C09D 11/322* (2013.01)

(58) Field of Classification Search
USPC ........................................................ 347/100
See application file for complete search history.

(56) References Cited

U.S. PATENT DOCUMENTS

| | | | | |
|---|---|---|---|---|
| 5,814,138 A * | 9/1998 | Fague | .................... | B41M 7/009 106/31.43 |
| 2003/0196569 A1 | 10/2003 | Yatake et al. | | |
| 2006/0075926 A1 * | 4/2006 | Aoki | ..................... | C09D 11/38 106/31.49 |
| 2006/0117994 A1 | 6/2006 | Ryu et al. | | |
| 2007/0064031 A1 * | 3/2007 | Nakano | ..................... | B41J 3/60 347/9 |
| 2007/0263054 A1 | 11/2007 | Yatake et al. | | |
| 2008/0146713 A1 * | 6/2008 | Yatake | ................. | B41J 2/14201 524/377 |
| 2008/0282932 A1 | 11/2008 | Kiyomoto et al. | | |
| 2009/0263632 A1 * | 10/2009 | Kojima | .................. | C09D 11/40 428/195.1 |
| 2011/0242199 A1 * | 10/2011 | Nishimura | ........... | C09D 11/322 347/21 |
| 2012/0320124 A1 * | 12/2012 | Saito | ..................... | C09D 11/326 347/21 |
| 2013/0260036 A1 * | 10/2013 | Shinohara | .............. | C09D 11/38 427/256 |
| 2015/0344713 A1 * | 12/2015 | Mizushima | .......... | C09D 11/322 347/100 |

FOREIGN PATENT DOCUMENTS

| | | |
|---|---|---|
| EP | 1 908 806 A1 | 4/2008 |
| EP | 2 290 023 A1 | 3/2011 |
| EP | 2 479 222 A1 | 7/2012 |
| JP | 2005-154549 A | 6/2005 |
| JP | 2007-138129 A | 6/2007 |
| JP | 2007-277329 A | 10/2007 |
| JP | 2008-260279 A | 10/2008 |

OTHER PUBLICATIONS

International Search Report issued in PCT/JP2013/083537 dated Feb. 27, 2014.
Office Action issued in the corresponding Chinese Patent Application No. 201380066394.4 on Apr. 26, 2016.

* cited by examiner

*Primary Examiner* — Shelby Fidler
(74) *Attorney, Agent, or Firm* — Birch, Stewart, Kolasch & Birch, LLP

(57) ABSTRACT

The present invention relates to [1] a pigment-containing water-based ink for ink-jet printing which is free of turbidity and excellent in capability of suppressing occurrence of image unevenness (MOTTLING) when printed on a low-water absorbing recording medium, said ink including at least one acetylene glycol (A) selected from the group consisting of 2,4,7,9-tetramethyl-5-decyne-4,7-diol and the like, and a nonionic surfactant (B), a content of the component (A) in the water-based ink being not less than 1.0% by mass and not more than 3.0% by mass, and a mass ratio of the component (B) to the component (A) [(B)/(A)] being not less than 1 and not more than 3; and [2] an ink-jet printing method for printing images or characters on a low-water absorbing recording medium using said water-based ink for ink-jet printing.

12 Claims, No Drawings

INK-JET PRINTING METHOD

FIELD OF THE INVENTION

The present invention relates to an ink-jet printing method, a water-based ink for ink-jet printing, and an image forming method using the water-based ink.

BACKGROUND OF THE INVENTION

In ink-jet printing methods, droplets of ink are directly projected onto a recording medium from very fine nozzles and allowed to adhere to the recording medium, to form images or characters. The ink-jet printing methods have become rapidly spread because of various advantages such as easiness of full coloration, low cost, capability of using a plain paper as the recording medium, non-contact with printed images or characters, etc.

In recent years, in order to impart a good weathering resistance and a good water resistance to printed matters, an ink containing a pigment as a colorant component has been extensively used.

On the other hand, there is an increasing demand for commercial printed matters printed on recording media using a low-liquid absorbing coated paper such as an offset-coated paper, or a non-liquid absorbing resin film such as a polyvinyl chloride resin film, a polypropylene resin film and a polyester resin film.

It is known that when images or characters are printed on the low-liquid absorbing or non-liquid absorbing recording media by the ink-jet printing methods, there tends to occur problems such as slow absorption of liquid components, prolonged drying time owing to poor absorption, and deterioration in rub fastness early after printing. Also, it is known that unlike a plain paper in which a pigment is likely to be penetrated, the low-liquid absorbing or non-liquid absorbing recording media tend to suffer from deposition of pigment particles remaining thereon which are directly susceptible to an external force, so that the images or characters printed on these recording media tend to be deteriorated in rub fastness even after being dried.

In order to solve these conventional problems, ink-jet printing methods using recording media having an ink-absorbing layer have been proposed.

For example, JP 2008-260279A discloses an ink-jet printing method using a recording medium having a pigment-containing coating layer in which an amount of pure water transferred to a surface of the recording medium on which the coating layer is provided, and a pH value of the same surface of the recording medium are controlled to respective specific ranges, and images or characters are printed on such a suface of the recording medium using an ink containing a granular coloring material, an emulsion resin and a surfactant and having a pH value of 8 or more. In addition, JP 2008-260279A proposes a recording apparatus equipped with a drying device.

However, the improvement in recording medium and recording apparatus tends to have problems concerning costs, consumed powder, etc., and therefore it is desirable to improve the composition of inks.

JP 2007-138129A discloses a process for producing an aqueous pigment ink composition in which a coloring pigment is dispersed in a mixed solution containing a pigment dispersant and/or a non-water-soluble resin, and a solvent to produce a non-aqueous pigment dispersion, and then the obtained non-aqueous pigment dispersion is mixed with the above non-water-soluble resin to produce a non-aqueous pigment ink, and thereafter an emulsifier and water are added to the thus obtained ink to emulsify and disperse the ink therein. In JP 2007-138129A, it is described that the resulting aqueous pigment ink composition is excellent in storage stability, adhesion and water resistance of printed images or characters, etc.

JP 2005-154549A discloses an aqueous ink composition constituted of a coloring material dispersion including a colorant-containing water-insoluble dispersed resin, acetylene glycol or an ether derivative thereof, a C1 to C5 monovalent alcohol compound and a humectant in which combination of the above alcohol, humectant, acetylene glycol, etc., is selected such that they can be dissolved in each other, and an ink-jet printing method using the aqueous ink composition. In JP 2005-154549A, it is described that the ink composition can satisfy both storage stability and ejection stability.

SUMMARY OF THE INVENTION

The present invention relates to the following aspects [1] to [4].

[1] An ink-jet printing method for printing images or characters on a low-water absorbing recording medium using a water-based ink for ink-jet printing, in which the water-based ink includes a specific acetylene glycol (A), a nonionic surfactant (B), a pigment and water, and a mass ratio between the component (A) and the component (B) lies within a specific range.

[2] A pigment-containing water-based ink for ink-jet printing, including a specific acetylene glycol (A) and a nonionic surfactant (B), in which a mass ratio between the component (A) and the component (B) lies within a specific range.

[3] An image forming method including the steps of mounting a container filled with the water-based ink for ink-jet printing as described in the above aspect [2] to an ink-jet printing apparatus equipped with an ink ejecting means; and ejecting the ink onto a low-water absorbing recording medium.

[4] A use of the water-based ink for ink-jet printing as described in the above aspect [2] for printing images or characters onto a low-water absorbing recording medium.

DETAILED DESCRIPTION OF THE INVENTION

The conventional technologies as described in JP 2008-260279A, JP 2007-138129A and JP 2005-154549A have failed to provide a satisfactory ink-jet printing method or water-based ink that is free from turbidity of the ink and is capable of suppressing image unevenness (MOTTLING) of printed images or characters. For example, acetylene glycol acts for improving wetting spread of the water-based ink, but the degree of wetting spread of the water-based ink tends to be insufficient when printed on a low-water absorbing or non-water absorbing recording medium, so that image unevenness (MOTTLING) of the printed images or characters is likely to occur. On the other hand, when the content of acetylene glycol in the water-based ink is increased in order to enhance wettability thereof, the water-based ink tends to suffer from turbidity owing to poor solubility of acetylene glycol in the water-based ink and also tends to be hardly improved in wetting spread.

The present invention relates to a water-based ink for ink-jet printing which is free from turbidity and is excellent in capability of suppressing image unevenness (MOT- TLING) of printed images or characters when printed on a low-water absorbing recording medium, and an ink-jet printing method for printing images or characters on a low-water absorbing recording medium using the water-based ink.

Meanwhile, the term "low-water absorption" as used in the present invention is intended to mean both concepts of low-water absorption and non-water absorption.

The present inventors have noticed a water-based ink containing a specific acetylene glycol (A) and a nonionic surfactant (B), and have found that when controlling an amount of the component (A) and a mass ratio of [(B)/(A)] to specific ranges, it is possible to solve and overcome the above conventional problems.

That is, the present invention relates to the following aspects [1] to [4].

[1] An ink-jet printing method for printing images or characters on a recording medium using a water-based ink for ink-jet printing, in which
the water-based ink includes at least one acetylene glycol (A) selected from the group consisting of 2,4,7,9-tetramethyl-5-decyne-4,7-diol, 3,6-dimethyl-4-octyne-3,6-diol and 2,5-dimethyl-3-hexyne-2,5-diol, a nonionic surfactant (B), a pigment and water;
a content of the component (A) in the water-based ink is not less than 1.0% by mass and not more than 3.0% by mass, and a mass ratio of the component (B) to the component (A) [(B)/(A)] is not less than 1 and not more than 3; and
the recording medium has a water absorption of not less than 0 g/m² and not more than 10 g/m² as measured in a pure water contact time of 100 ms.

[2] A pigment-containing water-based ink for ink-jet printing, including at least one acetylene glycol (A) selected from the group consisting of 2,4,7,9-tetramethyl-5-decyne-4,7-diol, 3,6-dimethyl-4-octyne-3,6-diol and 2,5-dimethyl-3-hexyne-2,5-diol, and a nonionic surfactant (B),
a content of the component (A) in the water-based ink being not less than 1.0% by mass and not more than 3.0% by mass, and a ratio of the component (B) to the component (A) [(B)/(A)] being not less than 1 and not more than 3.

[3] An image forming method including the steps of:
mounting a container filled with the water-based ink for ink-jet printing as described in the above aspect [2] to an ink-jet printing apparatus equipped with an ink ejecting means; and
ejecting the ink onto a recording medium having a water absorption of not less than 0 g/m² and not more than 10 g/m² as measured in a pure water contact time of 100 ms to print images or characters thereon.

[4] A use of the water-based ink for ink-jet printing as described in the above aspect [2] for printing images or characters onto a recording medium having a water absorption of not less than 0 g/m² and not more than 10 g/m² as measured in a pure water contact time of 100 ms.

In accordance with the present invention, it is possible to provide a water-based ink for ink-jet printing which is free from turbidity, excellent in effect of suppressing image unevenness (MOTTLING) when printed on a low-water absorbing recording medium, and exhibits excellent storage stability and ejection property, and an ink-jet printing method for printing images or characters on a low-water absorbing recording medium using the water-based ink.

[Water-Based Ink for Ink-Jet Printing]

The water-based ink for ink-jet printing according to the present invention is a pigment-containing water-based ink for ink-jet printing, and contains at least one acetylene glycol (A) selected from the group consisting of 2,4,7,9-tetramethyl-5-decyne-4,7-diol, 3,6-dimethyl-4-octyne-3,6-diol and 2,5-dimethyl-3-hexyne-2,5-diol (hereinafter also referred to merely as "acetylene glycol (A)" or a "component (A)"), and a nonionic surfactant (B) (hereinafter also referred to merely as a "component (B)") in which a content of the component (A) in the water-based ink is not less than 1.0% by mass and not more than 3.0% by mass, and a ratio of the component (B) to the component (A) [(B)/(A)] is not less than 1 and not more than 3.

The water-based ink for ink-jet printing according to the present invention is free from turbidity and can exhibit an excellent effect of suppressing image unevenness (MOTTLING) of printed images or characters when printed on a low-water absorbing recording medium. The reason therefore is considered as follows although not clearly determined yet.

In the case where the mass ratio of the nonionic surfactant (B) to the acetylene glycol (A) in the water-based ink is controlled to not less than 1, the water-based ink can be prevented from causing turbidity and occurrence of image unevenness (MOTTLING) of printed images or characters when printed on a low-water absorbing recording medium, owing to the combined effect of the acetylene glycol (A) and the nonionic surfactant (B) even when the content of the acetylene glycol (A) is not less than 1% by mass. However, if the content of the acetylene glycol (A) is more than 3.0% by mass, the acetylene glycol (A) tends to have an adverse influence on viscosity, ejection property and wetting spread of the water-based ink, so that it tends to be difficult to sufficiently suppress image unevenness (MOTTLING) of printed images or characters when printed on a low-water absorbing recording medium. In addition, when the mass ratio of the nonionic surfactant (B) to the acetylene glycol (A) is large, it tends to be difficult to attain an interaction between the nonionic surfactant (B) and the acetylene glycol (A). More specifically, it is considered that an excessive amount of the nonionic surfactant (B) which does not contribute to the solubility of the acetylene glycol (A) in the ink tends to provide an adverse influence on viscosity, ejection property and wetting spread of the water-based ink, so that it tends to be difficult to sufficiently suppress image unevenness (MOTTLING) of printed images or characters when printed on a low-water absorbing recording medium.

<Water-Based Ink for Ink-Jet Printing>

The water-based ink for ink-jet printing according to the present invention contains a pigment, and further contains at least one acetylene glycol (A) selected from the group consisting of 2,4,7,9-tetramethyl-5-decyne-4,7-diol, 3,6-dimethyl-4-octyne-3,6-diol and 2,5-dimethyl-3-hexyne-2,5-diol, and the nonionic surfactant (B).

Meanwhile, the term "water-based" as used herein means that water has the largest content among components of a medium contained in the ink, and an aqueous medium used therefore may be constituted of not only water solely but also a mixed solvent containing water and one or more kinds of organic solvents.

[Acetylene Glycol (A)]

At least one acetylene glycol selected from the group consisting of 2,4,7,9-tetramethyl-5-decyne-4,7-diol, 3,6-dimethyl-4-octyne-3,6-diol and 2,5-dimethyl-3-hexyne-2,5-diol as the component (A) is used for improving wetting spread of the water-based ink and suppressing image unevenness (MOTTLING) of printed images or characters when printed on a low-water absorbing recording medium.

Among these compounds, from the viewpoint of improving wetting spread of the water-based ink and suppressing image unevenness (MOTTLING) of printed images or characters when printed on a low-water absorbing recording medium, preferred is 2,4,7,9-tetramethyl-5-decyne-4,7-diol.

2,4,7,9-Tetramethyl-5-decyne-4,7-diol, 3,6-dimethyl-4-octyne-3,6-diol and 2,5-dimethyl-3-hexyne-2,5-diol can be synthesized by reacting acetylene with a ketone or an aldehyde corresponding to the aimed acetylene glycol, and may be produced, for example, by the method described in Takehiko Fujimoto, a fully revised edition "Shin-Kaimenkasseizai Nyumon (New Introduction to Surfactants)" published by Sanyo Chemical Industries, Ltd., 1992, pp 94-107, etc.

Examples of the commercially available products of the component (A) include "SURFYNOL 104PG-50", "SURFYNOL 104E", "SURFYNOL 104H", "SURFYNOL 104A", etc., available from Nissin Chemical Industry Co., Ltd., and Air Products & Chemicals, Inc.

The content of the component (A) in the water-based ink is not less than 1.0% by mass and not more than 3.0% by mass from the viewpoint of improving wetting spread of the water-based ink and suppressing image unevenness (MOTTLING) of printed images or characters when printed on a low-water absorbing recording medium. The content of the component (A) in the water-based ink is preferably not less than 1.2% by mass and more preferably not less than 1.3% by mass from the same viewpoints.

Also, from the viewpoint of improving the ejection property of the water-based ink and suppressing image unevenness (MOTTLING) of printed images or characters when printed on a low-water absorbing recording medium, and from the viewpoint of enhancing storage stability of the ink, the content of the component (A) in the water-based ink is preferably not more than 2.5% by mass, more preferably not more than 2.0% by mass and even more preferably not more than 1.8% by mass.

[Nonionic Surfactant (B)]

The nonionic surfactant as the component (B) is used for enhancing solubility of the component (A) in the water-based ink and suppressing turbidity of the ink.

Examples of the component (B) include polyethylene glycol-type nonionic surfactants, polyhydric alcohol-type nonionic surfactants and aliphatic acid alkanol amides.

As the component (B), an alkyleneoxide adduct of an alcohol having not less than 6 and not more than 30 carbon atoms is preferably used from the viewpoint of enhancing solubility of the component (A) in the water-based ink and suppressing turbidity of the ink and from the viewpoint of suppressing image unevenness (MOTTLING) of printed images or characters when printed on a low-water absorbing recording medium.

The number of carbon atoms of the alcohol is preferably not less than 8, more preferably not less than 10 and even more preferably not less than 12, and is also preferably not more than 24, more preferably not more than 22 and even more preferably not more than 20 from the same viewpoints as described above.

As the alkyleneoxide adduct of the alcohol, from the same viewpoints, an ethyleneoxide adduct of the alcohol and an ethyleneoxide/propyleneoxide adduct of the alcohol are preferred, and an ethyleneoxide adduct of the alcohol is more preferred.

From the same viewpoints as described above, as the component (B), even more preferred is a compound represented by the following formula (1).

RO-[(EO)m/(PO)n]-H (1)

wherein R is a hydrocarbon group having not less than 6 and not more than 30 carbon atoms; EO is an ethyleneoxy group; PO is a propyleneoxy group; m and n represent an average molar number of addition of ethyleneoxy groups and an average molar number of addition of propyleneoxy groups, respectively, m is a number of from 4 to 100, n is a number of from 0 to 50, and a sum of m and n is from 4 to 120; and the mark "/" means that EO and PO may have either a random structure or a block structure, and the order of addition of EO and PO is not limited.

The number of carbon atoms of the hydrocarbon group as R is preferably not less than 8, more preferably not less than 10 and even more preferably not less than 12, and is also preferably not more than 24, more preferably not more than 22 and even more preferably not more than 20 from the viewpoint of enhancing solubility of the component (A) in the water-based ink and suppressing turbidity of the ink and from the viewpoint of suppressing image unevenness (MOTTLING) of printed images or characters when printed on a low-water absorbing recording medium.

From the same viewpoints as described above, the hydrocarbon group is preferably a linear or branched alkyl group or alkenyl group, and more preferably a linear alkyl group or alkenyl group.

Examples of the hydrocarbon group having not less than 6 and not more than 30 carbon atoms include n-hexyl, n-heptyl, n-octyl, 2-ethylhexyl, n-nonyl, n-decyl, 2-propylheptyl, lauryl, myristyl, palmityl, stearyl, oleyl, 2-octyldecyl and behenyl. Among these groups, preferred are lauryl, myristyl, palmityl, stearyl, oleyl, 2-octyldecyl and behenyl.

The molar number of addition of ethyleneoxy groups (m) is from 4 to 100, and is preferably not less than 6, more preferably not less than 8 and even more preferably not less than 10, and is also preferably not more than 80, more preferably not more than 70 and even more preferably not more than 60, from the viewpoint of enhancing solubility of the component (A) in the water-based ink and suppressing turbidity of the ink and from the viewpoint of suppressing image unevenness (MOTTLING) of printed images or characters when printed on a low-water absorbing recording medium.

The molar number of addition of propyleneoxy groups (n) is from 0 to 50, and is preferably not more than 40, more preferably not more than 30 and even more preferably not more than 20, from the viewpoint of enhancing solubility of the component (A) in the water-based ink and suppressing turbidity of the ink and from the viewpoint of suppressing image unevenness (MOTTLING) of printed images or characters when printed on a low-water absorbing recording medium.

A sum of m and n is preferably not less than 6, more preferably not less than 8 and even more preferably not less than 10, and is also preferably not more than 80, more preferably not more than 70 and even more preferably not more than 60 from the same viewpoints as described above.

When n is not less than 2, the compound represented by the formula (1) may be in the form of either a block copolymer or a random copolymer. When the compound is in the form of a block copolymer, the compound preferably includes an oxyethylene chain on a hydroxyl group side thereof, i.e., RO-(PO)(EO)-H.

In addition, when the compound is in the form of a block copolymer, the compound may include a tri-block structure represented by RO-(EO)(PO)(EO)-H.

The content of the component (B) in the water-based ink is preferably not less than 1.0% by mass, more preferably not less than 1.5% by mass, even more preferably not less than 2.0% by mass and further even more preferably not less than 2.5% by mass from the viewpoint of enhancing solubility of the component (A) in the water-based ink and suppressing turbidity of the ink and from the viewpoint of suppressing image unevenness (MOTTLING) of printed images or characters when printed on a low-water absorbing recording medium. Also, the content of the component (B) in the water-based ink is preferably not more than 9.0% by mass, more preferably not more than 6.0% by mass, even more preferably not more than 5.0% by mass, further even more preferably not more than 4.5% by mass and further even more preferably not more than 4.0% by mass from the viewpoint of enhancing ejection property of the water-based ink and suppressing image unevenness (MOTTLING) of printed images or characters when printed on a low-water absorbing recording medium and from the viewpoint of improving a storage stability of the ink.

[Mass Ratio of Component (B) to Component (A)]

The mass ratio of the component (B) to the component (A) [component (B)/component (A)] is not less than 1 and not more than 3 from the viewpoint of enhancing solubility of the component (A) in the water-based ink and suppressing turbidity of the ink, from the viewpoint of suppressing image unevenness (MOTTLING) of printed images or characters when printed on a low-water absorbing recording medium, and from the viewpoint of improving ejection property and storage stability of the water-based ink.

The mass ratio [(B)/(A)] is preferably not less than 1.2, more preferably not less than 1.5 and even more preferably not less than 1.8 from the viewpoint of enhancing solubility of the component (A) in the water-based ink and suppressing turbidity of the ink and from the viewpoint of suppressing image unevenness (MOTTLING) of printed images or characters when printed on a low-water absorbing recording medium, and is also preferably not more than 2.8, more preferably not more than 2.5 and even more preferably not more than 2.2 from the viewpoint of enhancing ejection property of the water-based ink and suppressing image unevenness (MOTTLING) of printed images or characters when printed on a low-water absorbing recording medium, and from the viewpoint of improving storage stability of the ink.

[Pigment]

In the water-based ink according to the present invention, from the viewpoint of enhancing water resistance and weathering resistance of printed images or characters, the pigment is used as a colorant thereof.

The pigment may be either an inorganic pigment or an organic pigment and may also be used in combination with an extender pigment, if required.

Examples of the inorganic pigment include carbon blacks and metal oxides. In particular, carbon blacks are preferably used for black water-based inks. The carbon blacks may include furnace blacks, thermal lamp blacks, acetylene blacks and channel blacks.

Specific examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

The hue of the organic pigment used in the present invention is not particularly limited, and there may be used any chromatic color pigment having a yellow color, a magenta color, a cyan color, a blue color, a red color, an orange color, a green color, etc.

Specific examples of the preferred organic pigments include one or more pigments selected from the group consisting of commercially available products marketed under the tradenames C.I. Pigment Yellow, C.I. Pigment Red, C.I. Pigment Orange, C.I. Pigment Violet, C.I. Pigment Blue and C.I. Pigment Green, etc., with various product numbers.

The pigment contained in the water-based ink may be in the form of a self-dispersible pigment, a dispersant-dispersed pigment or pigment-containing water-insoluble polymer particles.

Among them, from the viewpoint of enhancing the fixing strength of the water-based ink on a low-water absorbing recording medium, the pigment contained in the water-based ink is preferably in the form of pigment-containing water-insoluble polymer particles (hereinafter also referred to merely as "pigment-containing polymer particles").

[Pigment-Containing Water-Insoluble Polymer Particles (Pigment-Containing Polymer Particles)]

(Water-Insoluble Polymer)

The water-insoluble polymer (hereinafter also referred to merely as a "component (c)") as used herein means a polymer exhibiting solubility in water of 10 g or lower, preferably 5 g or lower and more preferably 1 g or lower when the polymer is dried to a constant weight at 105° C. for 2 h, and then dissolved in 100 g of water at 25° C. In the case where the polymer is in the form of an anionic polymer, the solubility means solubility of the polymer whose anionic groups are neutralized completely (i.e., 100%) with sodium hydroxide.

Examples of the water-insoluble polymer used in the present invention include polyesters, polyurethanes and vinyl-based polymers. Among these polymers, preferred are vinyl-based polymers obtained by addition-polymerizing vinyl monomers (such as vinyl compounds, vinylidene compounds and vinylene compounds) from the viewpoint of enhancing storage stability of the water-based ink.

The vinyl-based polymer used in the present invention is preferably a vinyl-based polymer that is produced by copolymerizing a monomer mixture containing (c-1) an ionic monomer (hereinafter also referred to merely as a "component (c-1)") and (c-2) a hydrophobic monomer (hereinafter also referred to merely as a "component (c-2)") (such a mixture is hereinafter also referred to merely as a "monomer mixture"). The vinyl-based polymer contains a constitutional unit derived from the component (c-1) and a constitutional unit derived from the component (c-2). The vinyl-based polymer more preferably further contains a constitutional unit derived from (c-3) a macromonomer (hereinafter also referred to merely as a "component (c-3)").

[(c-1) Ionic Monomer]

The ionic monomer (c-1) is preferably used as a monomer component of the water-insoluble polymer from the viewpoint of enhancing dispersion stability of the pigment-containing polymer particles in the ink. Examples of the ionic monomer include anionic monomers and cationic monomers. Among these monomers, preferred are anionic monomers.

Examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Among the anionic monomers, from the viewpoint of enhancing dispersion stability of the pigment-containing polymer particles in the ink, preferred are the carboxylic acid monomers, and more preferred are acrylic acid and methacrylic acid.

[(c-2) Hydrophobic Monomer]

The hydrophobic monomer (c-2) is preferably used as a monomer component of the water-insoluble polymer from the viewpoint of enhancing dispersion stability of the pigment-containing polymer particles in the ink. Examples of the hydrophobic monomer include alkyl (meth)acrylates and aromatic group-containing monomers.

The preferred alkyl (meth)acrylates are those containing an alkyl group having 1 to 22 carbon atoms and preferably 6 to 18 carbon atoms. Examples of the alkyl (meth)acrylates include methyl (meth)acrylate, ethyl (meth)acrylate, (iso) propyl (meth)acrylate, (iso- or tertiary-)butyl (meth)acrylate, (iso)amyl (meth) acrylate, cyclohexyl (meth)acrylate, 2-ethylhexyl (meth) acrylate, (iso)octyl (meth)acrylate, (iso) decyl (meth)acrylate, (iso)dodecyl (meth)acrylate and (iso) stearyl (meth)acrylate.

Meanwhile, the terms "(iso- or tertiary-)" and "(iso)" as used herein mean both the structure in which the groups expressed by "iso or tertiary" and "iso" respectively are present, and the structure in which these groups are not present (i.e., normal), and the "(meth)acrylate" means an acrylate and/or a methacrylate.

The aromatic group-containing monomer is preferably a vinyl monomer containing an aromatic group having 6 to 22 carbon atoms which may contain a substituent group having a hetero atom, and more preferably a styrene-based monomer or an aromatic group-containing (meth)acrylate.

Specific examples of the preferred styrene-based monomer include styrene, 2-methyl styrene and vinyl benzene. Among these styrene-based monomer, more preferred is styrene.

Specific examples of the preferred aromatic group-containing (meth)acrylate include benzyl (meth)acrylate and phenoxyethyl (meth)acrylate. Among these aromatic group-containing (meth)acrylates, more preferred is benzyl (meth) acrylate.

As the hydrophobic monomer (c-2), two or more kinds of the above monomers may be used, and combination of the styrene-based monomer and the aromatic group-containing (meth)acrylate may also be used.

[(c-3) Macromonomer]

The macromonomer (c-3) is in the form of a compound containing a polymerizable functional group at one terminal end thereof and having a number-average molecular weight of not less than 500 and not more than 100,000, and is preferably used as a monomer component of the water-insoluble polymer from the viewpoint of enhancing dispersion stability of the pigment-containing polymer particles in the ink. The polymerizable functional group bonded to one terminal end of the macromonomer is preferably an acryloyloxy group or a methacryloyloxy group, and more preferably a methacryloyloxy group.

The macromonomer (c-3) preferably has a number-average molecular weight of not less than 1,000 and not more than 10,000. Meanwhile, the number-average molecular weight of the macromonomer (c-3) may be measured by gel permeation chromatography using chloroform containing 1 mmol/L of dodecyl dimethylamine as a solvent and using polystyrene as a reference standard substance.

As the macromonomer (c-3), from the viewpoint of enhancing dispersion stability of the pigment-containing polymer particles in the ink, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include those aromatic group-containing monomers as described with respect to the above hydrophobic monomer (c-2). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames all available from Toagosei Co., Ltd.), etc.

Examples of the silicone-based macromonomer include organopolysiloxanes containing a polymerizable functional group bonded to one terminal end thereof, etc.

[(c-4) Nonionic Monomer]

From the viewpoint of enhancing dispersion stability of the pigment-containing polymer particles in the ink, it is preferred that the water-insoluble polymer further contain (c-4) a nonionic monomer (hereinafter also referred to merely as a "component (c-4)") as a monomer component thereof.

Examples of the component (c-4) include 2-hydroxyethyl (meth)acrylate, 3-hydroxypropyl (meth)acrylate, polyalkylene glycol (meth)acrylates such as polypropylene glycol (n=2 to 30 wherein n represents an average molar number of addition of oxyalkylene groups: hereinafter defined in the same way) (meth)acrylate and polyethylene glycol (n=2 to 30) (meth) acrylate, alkoxy polyalkylene glycol (meth) acrylates such as methoxy polyethylene glycol (n=1 to 30) (meth)acrylate, and phenoxy (ethylene glycol/propylene glycol copolymer) (n=1 to 30 in which n for ethylene glycol: 1 to 29) (meth)acrylate.

Specific examples of commercially available products of the component (c-4) include "NK ESTER M-20G", "NK ESTER M-40 G", "NK ESTER M-90G" and "NK ESTER M-230G" all available from Shin-Nakamura Kagaku Kogyo Co., Ltd.; and "BLEMMER PE-90", "BLEMMER PE-200", "BLEMMER PE-350", "BLEMMER PME-100", "BLEMMER PME-200", "BLEMMER PME-400", "BLEMMER PP-500", "BLEMMER PP-800", "BLEMMER PP-1000", "BLEMMER AP-150", "BLEMMER AP-400", "BLEMMER AP-550", "BLEMMER 50PEP-300", "BLEMMER 50POEP-800B" and "BLEMMER 43PAPE-600B" all available from NOF Corporation.

These components (c-1) to (c-4) may be respectively used alone or in the form of a mixture of any two or more thereof.

(Contents of Respective Components or Constitutional Units in Monomer Mixture or Polymer)

Upon production of the vinyl-based polymer, the contents of the above components (c-1) to (c-4) in the monomer mixture (contents of non-neutralized components; hereinafter defined in the same way) or the contents of the constitutional units derived from the components (c-1) to (c-4) in the water-insoluble polymer are as follows from the viewpoint of enhancing dispersion stability of the pigment-containing polymer particles in the ink.

The content of the component (c-1) is preferably not less than 3% by mass, more preferably not less than 5% by mass and even more preferably not less than 7% by mass, and is also preferably not more than 40% by mass, more preferably not more than 30% by mass and even more preferably not more than 20% by mass.

The content of the component (c-2) is preferably not less than 5% by mass, more preferably not less than 10% by mass and even more preferably not less than 20% by mass, and is also preferably not more than 86% by mass, more preferably not more than 70% by mass and even more preferably not more than 50% by mass.

The content of the component (c-3) is preferably not less than 1% by mass, more preferably not less than 5% by mass and even more preferably not less than 7% by mass, and is also preferably not more than 25% by mass, more preferably not more than 20% by mass and even more preferably not more than 18% by mass.

The content of the component (c-4) is preferably not less than 5% by mass, more preferably not less than 10% by mass and even more preferably not less than 20% by mass, and is also preferably not more than 60% by mass, more preferably not more than 55% by mass and even more preferably not more than 50% by mass.

The mass ratio of the component (c-1) to a sum of the component (c-2) and the component (c-3) [component (c-1)/[component (c-2)+component (c-3)]] is preferably not less than 0.01, more preferably not less than 0.05 and even more preferably not less than 0.10, and is also preferably not more than 1.00, more preferably not more than 0.60 and even more preferably not more than 0.40. Thus, the mass ratio of the component (c-1) to a sum of the component (c-2) and the component (c-3) [component (c-1)/[component (c-2)+component (c-3)]] is preferably from 0.01 to 1, more preferably from 0.05 to 0.60 and even more preferably from 0.10 to 0.40.

(Production of Water-Insoluble Polymer)

The water-insoluble polymer may be produced by copolymerizing the above monomer mixture by known polymerization methods. Among the polymerization methods, preferred is a solution polymerization method.

The solvent used in the solution polymerization method is not particularly limited, and is preferably a polar organic solvent such as aliphatic alcohols having 1 to 3 carbon atoms, ketones, ethers and esters. Specific examples of the solvent include methanol, ethanol, acetone and methyl ethyl ketone. Of these solvents, preferred is methyl ethyl ketone.

The polymerization may be carried out in the presence of a polymerization initiator or a chain transfer agent. As the polymerization initiator, preferred are azo compounds, and more preferred is 2,2'-azobis(2,4-dimethylvaleronitrile). As the chain transfer agent, preferred are mercaptans, and more preferred is 2-mercaptoethanol.

The preferred polymerization conditions may vary depending upon the kind of polymerization initiator used, etc. The polymerization temperature is preferably not lower than 50° C. and not higher than 90° C., and the polymerization time is preferably not shorter than 1 h and not longer than 20 h. Further, the polymerization is preferably conducted in an inert gas atmosphere such as a nitrogen atmosphere and argon.

After completion of the polymerization reaction, the polymer thus produced may be isolated from the reaction solution by a known method such as reprecipitation and removal of solvent by distillation. The thus obtained polymer may be subjected to reprecipitation, membrane separation, chromatography, extraction, etc., for removing unreacted monomers, etc., therefrom.

The water-insoluble polymer is preferably used as such in the form of a polymer solution without removing the solvent used in the polymerization reaction therefrom in order to use the organic solvent contained therein as an organic solvent in the below-mentioned step 1 from the viewpoint of enhancing productivity of a water dispersion of the pigment-containing polymer particles.

The solid content of the water-insoluble polymer solution is preferably not less than 30% by mass and more preferably not less than 40% by mass, and is also preferably not more than 60% by mass and more preferably not more than 50% by mass from the viewpoint of enhancing productivity of the water dispersion of the pigment-containing polymer particles.

The weight-average molecular weight of the water-insoluble polymer used in the present invention is preferably not less than 5,000, more preferably not less than 10,000 and even more preferably not less than 20,000, and is also preferably not more than 500,000, more preferably not more than 400,000, even more preferably not more than 300,000 and further even more preferably not more than 200,000 from the viewpoint of enhancing dispersion stability of the pigment-containing polymer particles in the ink as well as from the viewpoint of improving the fixing strength of the water-based ink on a low-water absorbing recording medium.

Meanwhile, the weight-average molecular weight may be measured by the method described in Examples below.

[Production of Pigment-Containing Polymer Particles]

The pigment-containing polymer particles can be efficiently produced in the form of a water dispersion thereof by the process including the following steps I and II.

Step I: subjecting a mixture of a water-insoluble polymer, an organic solvent, a pigment and water (hereinafter also referred to as a "pigment mixture") to dispersion treatment to obtain a dispersion of pigment-containing polymer particles; and Step II: removing the organic solvent from the dispersion obtained in the step I to obtain a water dispersion of the pigment-containing polymer particles (hereinafter also referred to merely as a "pigment water dispersion").

In addition, the above process may further include the following step III as an optional step.

Step III: mixing the water dispersion obtained in the step II with a crosslinking agent to subject the polymer particles to crosslinking treatment, thereby obtaining a water dispersion of the crosslinked polymer particles.

(Step I)

In the step I, it is preferred that the water-insoluble polymer is first dissolved in the organic solvent, and then the pigment and water, if required, together with a neutralizing agent, a surfactant and the like, are added and mixed in the resulting organic solvent solution to obtain a dispersion of an oil-in-water type. The order of addition of the respective components added to the water-insoluble polymer organic solvent solution is not particularly limited, and it is preferred that water, the neutralizing agent and the pigment are successively added in this order.

The organic solvent in which the water-insoluble polymer can be dissolved is not particularly limited, and is preferably selected from aliphatic alcohols having 1 to 3 carbon atoms, ketones, ethers, esters and the like. Of these organic solvents, more preferred are ketones, and even more preferred is methyl ethyl ketone. When the water-insoluble polymer is synthesized by a solution polymerization method, the solvent used in the polymerization method may be used as such in the step I.

When the water-insoluble polymer is an anionic polymer, an anionic group contained in the water-insoluble polymer may be neutralized using a neutralizing agent. When using the neutralizing agent, the pH value of the dispersion of the water-insoluble polymer is preferably controlled to not less than 7 and not more than 11. Examples of the neutralizing agent include bases such as lithium hydroxide, sodium hydroxide, potassium hydroxide, ammonia and various amines. In addition, the water-insoluble polymer may be previously neutralized.

The degree of neutralization of the anionic group in the water-insoluble polymer is preferably not less than 30 mol %, more preferably not less than 40 mol % and even more preferably not less than 50 mol %, and is also preferably not more than 300 mol %, more preferably not more than 200 mol % and even more preferably not more than 150 mol % from the viewpoint of enhancing dispersion stability of the pigment-containing polymer particles in the ink and in the pigment water dispersion.

The degree of neutralization as used herein means the value calculated by dividing a mole equivalent amount of the neutralizing agent by a molar amount of the anionic group in the water-insoluble polymer.

(Contents of Respective Components in Pigment Mixture)

The content of the pigment in the pigment mixture is preferably not less than 10% by mass, more preferably not less than 12% by mass and even more preferably not less than 14% by mass, and is also preferably not more than 30% by mass, more preferably not more than 25% by mass and even more preferably not more than 20% by mass from the viewpoint of enhancing dispersion stability of the pigment-containing polymer particles in the ink and in the pigment water dispersion as well as from the viewpoint of improving productivity of the pigment water dispersion.

The content of the water-insoluble polymer in the pigment mixture is preferably not less than 2.0% by mass, more preferably not less than 4.0% by mass and even more preferably not less than 5M % by mass, and is also preferably not more than 15% by mass, more preferably not more than 12% by mass and even more preferably not more than 10% by mass from the viewpoint of enhancing dispersion stability of the pigment water dispersion and a storage stability and ejection property of the water-based ink as well as from the viewpoint of improving fixing strength of the water-based ink on a low-water absorbing recording medium.

The content of the organic solvent in the pigment mixture is preferably not less than 10% by mass, more preferably not less than 12% by mass and even more preferably not less than 15% by mass, and is also preferably not more than 35% by mass, more preferably not more than 30% by mass and even more preferably not more than 25% by mass from the viewpoint of improving wettability to the pigment and adsorbing property of the water-insoluble polymer to the pigment.

The content of water in the pigment mixture is preferably not less than 40% by mass, more preferably not less than 45% by mass and even more preferably not less than 50% by mass, and is also preferably not more than 75% by mass, more preferably not more than 70% by mass and even more preferably not more than 65% by mass from the viewpoint of enhancing dispersion stability of the pigment water dispersion as well as from the viewpoint of improving productivity of the pigment water dispersion.

The mass ratio of the pigment to the water-insoluble polymer [pigment/water-insoluble polymer] is preferably from 30/70 to 90/10, more preferably from 40/60 to 80/20 and even more preferably from 50/50 to 70/30 from the viewpoint of enhancing dispersion stability of the pigment water dispersion and a storage stability and ejection property of the water-based ink as well as from the viewpoint of improving fixing strength of the water-based ink on a low-water absorbing recording medium. Also, the mass ratio of the pigment to the water-insoluble polymer [pigment/water-insoluble polymer] is preferably not less than 30/70, more preferably not less than 50/50 and even more preferably not less than 70/30, and is also preferably not more than 90/10, more preferably not more than 85/15 and even more preferably not more than 80/20.

In the step I, the pigment mixture is further dispersed to obtain a dispersion treatment product. The dispersing method for obtaining the dispersion treatment product is not particularly limited. The pigment particles may be finely atomized into fine particles having a desired average particle size only by a substantial dispersion treatment. Preferably, the pigment mixture is first subjected to a preliminary dispersion treatment, and then to the substantial dispersion treatment by applying a shear stress thereto so as to control the average particle size of the obtained pigment particles to a desired value.

The temperature used in the preliminary dispersion treatment in the step I is preferably not lower than 0° C., and is also preferably not higher than 40° C., more preferably not higher than 30° C. and even more preferably not higher than 20° C. The dispersing time is preferably not shorter than 0.5 h and more preferably not shorter than 1 h, and is also preferably not longer than 30 h, more preferably not longer than 10 h and even more preferably not longer than 5 h.

When subjecting the pigment mixture to the preliminary dispersion treatment, there may be used ordinary mixing or stirring devices such as anchor blades and disper blades. Of these devices, preferred are high-speed stirring mixers.

As a means for applying a shear stress to the pigment mixture in the substantial dispersion treatment, there may be used, for example, kneading machines such as roll mills and kneaders, high-pressure homogenizers such as "Micro Fluidizer" (available from Microfluidics Inc.), and media-type dispersers such as paint shakers and beads mills. Examples of the commercially available media-type dispersers include "Ultra Apex Mill" (available from Kotobuki Industries Co., Ltd.) and "Pico Mill" (available from Asada Iron Works Co., Ltd.). These devices may be used in combination of any two or more thereof. Among these devices, the high-pressure homogenizers are preferably used from the viewpoint of reducing the particle size of the pigment.

When conducting the substantial dispersion treatment using the high-pressure homogenizers, it is possible to adjust the particle size of the pigment to a desired value by controlling pressure used in the substantial dispersion treatment or frequency of passing the dispersion through the devices.

The pressure used in the substantial dispersion treatment is preferably not less than 60 MPa, more preferably not less than 100 MPa and even more preferably not less than 130 MPa, and is also preferably not more than 200 MPa and more preferably not more than 180 MPa from the viewpoint of enhancing productivity and economy.

The frequency of passing the dispersion through the devices is preferably not less than 3 passes and more preferably not less than 10 passes, and is also preferably not more than 30 passes and more preferably not more than 25 passes.

(Step II)

In the step II, the organic solvent is removed from the dispersion obtained in the previous step by any known methods to obtain a water dispersion of the pigment-containing polymer particles. The organic solvent is preferably substantially completely removed from the thus obtained water dispersion containing the pigment-containing polymer particles. However, the residual organic solvent may be present in the water dispersion unless the objects and effects of the present invention are adversely affected by the residual organic solvent. The content of the residual organic solvent in the water dispersion is preferably not more than 0.1% by weight and more preferably not more than 0.01% by weight.

In addition, if required, the dispersion may be subjected to heating and stirring treatments before removing the organic solvent by distillation therefrom.

In the thus-obtained water dispersion of the pigment-containing polymer particles, the solid pigment-containing water-insoluble polymer particles are dispersed in a medium containing water as a main medium. The configuration of the water-insoluble polymer particles is not particularly limited, and the water-insoluble polymer particles may have any configuration as long as the particles are formed from at least the pigment and the water-insoluble polymer. Examples of the configuration of the water-insoluble polymer particles include the particle configuration in which the pigment is enclosed in the water-insoluble polymer, the particle configuration in which the pigment is uniformly dispersed in the water-insoluble polymer, and the particle configuration in which the pigment is exposed onto a surface of the respective water-insoluble polymer particles, as well as mixtures thereof.

(Step III)

The step III is an optional step. In the step III, the water dispersion obtained in the step II is mixed with a crosslinking agent to subject the polymer particles to crosslinking treatment, thereby obtaining a water dispersion of the crosslinked polymer particles. The step III is preferably carried out from the viewpoint of enhancing storage stability of the water dispersion and the ink.

When the water-insoluble polymer is an anionic water-insoluble polymer containing an anionic group, the crosslinking agent used in this step is preferably in the form of a compound containing a functional group capable of reacting with the anionic group of the polymer, more preferably a compound containing the two or more functional groups in a molecule thereof, and even more preferably a compound containing the 2 to 6 functional groups in a molecule thereof.

Suitable examples of the crosslinking agent include compounds containing two or more epoxy groups in a molecule thereof, compounds containing two or more oxazoline groups in a molecule thereof, and compounds containing two or more isocyanate groups in a molecule thereof. Among these crosslinking agents, preferred are compounds containing two or more epoxy groups in a molecule thereof, and more preferred is trimethylolpropane polyglycidyl ether.

The concentration of the non-volatile components (solid content) in the resulting pigment water dispersion is preferably not less than 10% by mass and more preferably not less than 15% by mass, and is also preferably not more than 30% by mass and more preferably not more than 25% by mass from the viewpoint of enhancing dispersion stability of the pigment water dispersion as well as from the viewpoint of facilitating preparation of the water-based ink.

The average particle size of the pigment-containing polymer particles in the pigment water dispersion is preferably not less than 40 nm, more preferably not less than 60 nm and even more preferably not less than 75 nm, and is also preferably not more than 150 nm, more preferably not more than 120 nm and even more preferably not more than 110 nm from the viewpoint of suppressing formation of coarse particles and improving ejection property of the water-based ink.

Meanwhile, the average particle size of the pigment-containing polymer particles may be measured by the method described in Examples below.

The average particle size of the pigment-containing polymer particles in the water-based ink is the same as the average particle size of the particles in pigment water dispersion, and the preferred range of the average particle size of the pigment-containing polymer particles in the water-based ink is also the same as that of the average particle size of the particles in pigment water dispersion.

(Contents of Respective Components in Water-Based Ink)

The content of the pigment in the water-based ink is preferably not less than 1.0% by mass, more preferably not less than 2.0% by mass and even more preferably not less than 2.5% by mass from the viewpoint of enhancing an optical density of the water-based ink, and is also preferably not more than 15% by mass, more preferably not more than 10% by mass and even more preferably not more than 7% by mass from the viewpoint of reducing viscosity of the ink upon evaporating the solvent therefrom, and suppressing image unevenness (MOTTLING) when printed on a low-water absorbing recording medium as well as from the viewpoint of improving storage stability and ejection property of the water-based ink.

The amount of the pigment water dispersion compounded in the water-based ink is preferably not less than 10% by mass, more preferably not less than 15% by mass and even more preferably not less than 20% by mass from the viewpoint of enhancing optical density of the water-based ink, and is also preferably not more than 50% by mass, more preferably not more than 45% by mass and even more preferably not more than 40% by mass from the viewpoint of reducing viscosity of the ink upon evaporating the solvent therefrom, and suppressing image unevenness (MOTTLING) when printed on a low-water absorbing recording medium as well as from the viewpoint of improving storage stability and ejection property of the water-based ink.

The content of the pigment-containing polymer particles in the water-based ink is preferably not less than 1% by mass, more preferably not less than 3% by mass and even more preferably not less than 4% by mass from the viewpoint of enhancing optical density of the water-based ink, and is also preferably not more than 20% by mass, more preferably not more than 10% by mass and even more preferably not more than 8% by mass from the viewpoint of reducing viscosity of the ink upon evaporating the solvent therefrom, and suppressing image unevenness (MOTTLING) when printed on a low-water absorbing recording medium as well as from the viewpoint of improving storage stability and ejection property of the water-based ink.

The content of the water-insoluble polymer in the water-based ink is preferably not less than 0.5% by mass, more preferably not less than 0.8% by mass and even more preferably not less than 1.0% by mass from the viewpoint of enhancing storage stability and ejection property of the water-based ink and improving fixing strength of the ink to a low-water absorbing recording medium, and is also preferably not more than 6% by mass, more preferably not more than 4% by mass and even more preferably not more than 3% by mass from the viewpoint of reducing viscosity of the ink upon evaporating the solvent therefrom, and suppressing image unevenness (MOTTLING) when printed on a low-water absorbing recording medium as well as from the viewpoint of improving storage stability and ejection property of the water-based ink.

[Optional Components of Water-Based Ink]

The water-based ink according to the present invention may also contain an organic solvent, a water-insoluble polymer other than the water-insoluble polymer for enhancing fixing property of the ink, and various additives such as a viscosity controller, a defoaming agent, an antiseptic agent, a mildew-proof agent and a rust preventive.

(Organic Solvent)

Preferred examples of the organic solvent include polyhydric alcohols such as glycerin, 1,2-hexanediol, diethylene glycol and ethylene glycol, pyrrolidones such as 2-pyrrolidone, and glycol ethers such as triethylene glycol monobutyl ether and polyoxyethylene lauryl ether. These organic solvents are preferably used in combination of any two or more thereof.

In the present invention, the content of the organic solvent in the water-based ink is preferably not less than 5% by mass, more preferably not less than 10% by mass and even more preferably not less than 20% by mass from the viewpoint of enhancing ejection property of the ink, and is also preferably not more than 50% by mass and more preferably not more than 40% by mass from the viewpoint of suppressing image unevenness (MOTTLING) when printed on a low-water absorbing recording medium as well as from the viewpoint of improving storage stability and ejection property of the water-based ink.

[Method for Producing Water-Based Ink for Ink-Jet Printing]

The water-based ink for ink-jet printing can be produced by mixing 2,4,7,9-tetramethyl-5-decyne-4,7-diol, the nonionic surfactant, the pigment and the dispersant, or the water dispersion of the pigment-containing polymer particles, the organic solvent and water, etc., with each other, and stirring the resulting mixture.

[Properties of Water-Based Ink]

The viscosity of the water-based ink for ink-jet printing as measured at 32° C. is preferably not less than 2.0 mPa·s, more preferably not less than 3.0 mPa·s and even more preferably not less than 4.0 mPa·s from the viewpoint of enhancing ejection property of the water-based ink, and is also preferably not more than 12 mPa·s, more preferably not more than 10.0 mPa·s, even more preferably not more than 8.0 mPa·s and further even more preferably not more than 7.0 mPa·s from the viewpoint of enhancing a storage stability and ejection property of the water-based ink. Meanwhile, the viscosity of the water-based ink at 32° C. may be measured by the method described in Examples below.

From the viewpoint of suppressing image unevenness (MOTTLING) when printed on a low-water absorbing recording medium, the surface tension of the water-based ink for ink-jet printing is preferably not less than 25.0 mN/m, more preferably not less than 26.0 mN/m and even more preferably not less than 26.5 mN/m, and is also preferably not more than 30.0 mN/m, more preferably not more than 29.0 mN/m and even more preferably not more than 28.5 mN/m. Meanwhile, the surface tension of the water-based ink may be measured by the method described in Examples below.

The pH value of the water-based ink for ink-jet printing is preferably not less than 7.0, more preferably not less than 8.0 and even more preferably not less than 8.5 from the viewpoint of enhancing storage stability and ejection property of the water-based ink, and is also preferably not more than 11.0, more preferably not more than 10.0 and even more preferably 9.5 from the viewpoint of improving resistance of members of an ink-jet printer to the ink and suppressing skin irritation. Meanwhile, the pH value of the water-based ink may be measured by the method described in Examples below.

<Ink-Jet Printing Method>

The ink-jet printing method according to the present invention is a method for printing images or characters on a low-water absorbing recording medium using the above water-based ink for ink-jet printing.

[Recording Medium for Ink-Jet Printing]

(Water Absorption)

The water absorption of a recording medium for ink-jet printing as measured in a pure water contact time of 100 ms is not less than 0 $g/m^2$ and not more than 10 $g/m^2$. More specifically, the water absorption of the recording medium for ink-jet printing as measured in a pure water contact time of 100 ms is preferably not less than 1.0 $g/m^2$, more preferably not less than 2.0 $g/m^2$, even more preferably not less than 3.0 $g/m^2$ and further even more preferably not less than 4.0 $g/m^2$ from the viewpoint of promoting drying of printed images or characters, enhancing the fixing strength of the ink and suppressing image unevenness (MOTTLING) of printed images or characters, and is also preferably not more than 8.0 $g/m^2$, more preferably not more than 7.0 $g/m^2$, even more preferably not more than 6.0 $g/m^2$ and further even more preferably not more than 5.5 $g/m^2$ from the viewpoint of suppressing image unevenness (MOTTLING) of printed images or characters and enhancing an optical density and a gloss of the ink. Meanwhile, the water absorption of the recording medium for ink-jet printing as measured in a pure water contact time of 100 ms may be measured by the method described in Examples below.

(Properties)

The 60° gloss of the recording medium is preferably not less than 5, more preferably not less than 20 and even more preferably not less than 30, and is also preferably not more than 200, from the viewpoint of enhancing a gloss and a visibility of printed images or characters. The 60° gloss of the recording medium may be measured by a gloss meter "HANDY GLOSSMETER, Model No.: PG-1M" available from Nippon Denshoku Industries Co., Ltd.

The recording medium for ink-jet printing used in the present invention may be a coated paper or a film.

Examples of the coated paper include "OK Topcoat+" (available from Oji Paper Co., Ltd.; basis weight: 104.7 $g/m^2$; 60° gloss: 49.0; water absorption as measured in a pure water contact time of 100 ms (hereinafter defined in the same way): 4.9 $g/m^2$), a multi-color foam gloss coated paper (available from Oji Paper Co., Ltd.; basis weight: 104.7 $g/m^2$; 60° gloss: 36.8; water absorption: 5.2 $g/m^2$), "UPM Finesse Gloss" (available from UPM; basis weight: 115 $g/m^2$; 60° gloss: 27.0; water absorption: 3.1 $g/m^2$), "UPM Finesse Matt" (available from UPM; basis weight: 115 $g/m^2$; 60° gloss: 5.6; water absorption: 4.4 $g/m^2$), "TerraPress Silk" (available from Stora Enso; basis weight: 80 $g/m^2$; 60° gloss; 6.0; water absorption: 4.1 $g/m^2$), and "LumiArt" (available from Stora Enso; basis weight: 90 $g/m^2$; 60° gloss: 26.3).

Examples of the film include a polyester film, a vinyl chloride film, a polypropylene film, a polyethylene film and a nylon film. These films may be subjected to surface treatments such as corona treatment, etc., if required.

Examples of the generally available films include "LUMIRROR T60" (available from Toray Industries Inc.; polyethylene terephthalate; thickness: 125 µm; 60° gloss: 189.1; water absorption: 2.3 $g/m^2$), "PVC80B P" (available from Lintec Corp.; polyvinyl chloride; 60° gloss: 58.8; water absorption: 1.4 $g/m^2$), "KINATH KEE 70CA" (available from Lintec Corp.; polyethylene), "YUPO SG90 PAT1" (available from Lintec Corp.; polypropylene), and "BONYL RX" (available from Kohjin Film & Chemical Co., Ltd.; nylon).

[Ink-Jet Printing Method and Image Forming Method]

In the ink-jet printing method and the image-forming method according to the present invention, a container filled with the above water-based ink for ink-jet printing is mounted to an ink-jet printing apparatus equipped with an ink ejecting means, and the water-based ink is ejected onto the recording medium for ink-jet printing to print images or characters thereon.

The ink-jet printing method may also include the step of drying the images or characters printed on the recording medium for ink-jet printing.

The ink ejecting means may include a thermal-type or piezoelectric-type ink-jet head for ejecting the ink therethrough. Among these methods, the method of ejecting the ink using a piezoelectric-type ink-jet head to print the images or characters is preferably used in the present invention.

<Use of Water-Based Ink for Ink-Jet Printing for Printing>

When using the water-based ink for ink-jet printing according to the present invention for printing, the water-based ink for ink-jet printing is used for printing images or characters on a recording medium having a water absorption of not less than 0 g/m$^2$ and not more than 10 g/m$^2$ as measured in a pure water contact time of 100 ms.

With respect to the aforementioned embodiments, the present invention further provides the following aspects relating to the water-based inks for ink-jet printing and ink-jet printing methods.

<1> A pigment-containing water-based ink for ink-jet printing, including at least one acetylene glycol (A) selected from the group consisting of 2,4,7,9-tetramethyl-5-decyne-4,7-diol, 3,6-dimethyl-4-octyne-3,6-diol and 2,5-dimethyl-3-hexyne-2,5-diol and a nonionic surfactant (B), a content of the component (A) in the water-based ink being not less than 1.0% by mass and not more than 3.0% by mass, and a ratio of the component (B) to the component (A) [(B)/(A)] being not less than 1 and not more than 3.

<2> The water-based ink for ink-jet printing as described in the above aspect <1>, wherein the component (A) is preferably 2,4,7,9-tetramethyl-5-decyne-4,7-diol.

<3> The water-based ink for ink-jet printing as described in the above aspect <1> or <2>, wherein a content of the component (A) in the water-based ink is preferably not less than 1.2% by mass and more preferably not less than 1.3% by mass, and is also preferably not more than 2.5% by mass, more preferably not more than 2.0% by mass and even more preferably not more than 1.8% by mass.

<4> The water-based ink for ink-jet printing as described in any one of the above aspects <1> to <3>, wherein the nonionic surfactant (B) is preferably an alkyleneoxide adduct of an alcohol having not less than 6 and not more than 30 carbon atoms.

<5> The water-based ink for ink-jet printing as described in the above aspect <4>, wherein a number of carbon atoms of the alcohol contained in the alkyleneoxide adduct of the alcohol having not less than 6 and not more than 30 carbon atoms is preferably not less than 8, more preferably not less than 10 and even more preferably not less than 12, and is also preferably not more than 24, more preferably not more than 22 and even more preferably not more than 20.

<6> The water-based ink for ink-jet printing as described in the above aspect <4> or <5>, wherein the alkyleneoxide adduct of the alcohol having not less than 6 and not more than 30 carbon atoms is preferably an ethyleneoxide adduct of the alcohol or a an ethyleneoxide/propyleneoxide adduct of the alcohol, and more preferably an ethyleneoxide adduct of the alcohol.

<7> The water-based ink for ink-jet printing as described in any one of the above aspects <1> to <6>, wherein the nonionic surfactant (B) is preferably a compound represented by the general formula (1).

<8> The water-based ink for ink-jet printing as described in the above aspect <7>, wherein in the general formula (1), a number of carbon atoms of the hydrocarbon group as R is preferably not less than 8, more preferably not less than 10 and even more preferably not less than 12, and is also preferably not more than 24, more preferably not more than 22 and even more preferably not more than 20.

<9> The water-based ink for ink-jet printing as described in the above aspect <7> or <8>, wherein in the general formula (1), the hydrocarbon group is preferably a linear or branched alkyl group or alkenyl group, more preferably a linear alkyl group or alkenyl group, even more preferably n-hexyl, n-heptyl, n-octyl, 2-ethylhexyl, n-nonyl, n-decyl, 2-propylheptyl, lauryl, myristyl, palmityl, stearyl, oleyl, 2-octyldecyl and behenyl, and further even more preferably lauryl, myristyl, palmityl, stearyl, oleyl, 2-octyldecyl and behenyl.

<10> The water-based ink for ink-jet printing as described in any one of the above aspects <7> to <9>, wherein in the general formula (1), m is preferably not less than 6, more preferably not less than 8 and even more preferably not less than 10, and is also preferably not more than 80, more preferably not more than 70 and even more preferably not more than 60.

<11> The water-based ink for ink-jet printing as described in any one of the above aspects <7> to <10>, wherein in the general formula (1), n is preferably not more than 40, more preferably not more than 30 and even more preferably not more than 20.

<12> The water-based ink for ink-jet printing as described in any one of the above aspects <7> to <11>, wherein in the general formula (1), a sum of m and n is preferably not less than 6, more preferably not less than 8 and even more preferably not less than 10, and is also preferably not more than 80, more preferably not more than 70 and even more preferably not more than 60.

<13> The water-based ink for ink-jet printing as described in any one of the above aspects <7> to <12>, wherein in the general formula (1), when n is not less than 2 and the compound represented by the general formula (1) is in the form of a block copolymer, the compound preferably has a structure represented by RO-(PO)(EO)-H or RO-(EO)(PO)(EO)-H.

<14> The water-based ink for ink-jet printing as described in any one of the above aspects <1> to <13>, wherein a content of the component (B) in the water-based ink is preferably not less than 1.0% by mass, more preferably not less than 1.5% by mass, even more preferably not less than 2.0% by mass and further even more preferably not less than 2.5% by mass, and is also preferably not more than 9.0% by mass, more preferably not more than 6.0% by mass, even more preferably not more than 5.0% by mass, further even more preferably not more than 4.5% by mass, and further even more preferably not more than 4.0% by mass.

<15> The water-based ink for ink-jet printing as described in any one of the above aspects <1> to <14>, wherein a mass ratio of the component (B) to the component (A) [(B)/(A)] is preferably not less than 1.2, more preferably not less than 1.5 and even more preferably not less than 1.8, and is also preferably not more than 2.8, more preferably not more than 2.5 and even more preferably not more than 2.2.

<16> The water-based ink for ink-jet printing as described in any one of the above aspects <1> to <15>, wherein the pigment contained in the water-based ink is preferably in the form of a self-dispersible pigment, a dispersant-dispersed pigment or pigment-containing water-insoluble polymer particles, and more preferably in the form of pigment-containing water-insoluble polymer particles.

<17> The water-based ink for ink-jet printing as described in the above aspect <16>, wherein the water-insoluble polymer is preferably a vinyl-based polymer containing a constitutional unit derived from (c-1) an ionic monomer and a constitutional unit derived from (c-2) a hydrophobic monomer, and more preferably a vinyl-based polymer further containing a constitutional unit derived from (c-3) a macromonomer and a constitutional unit derived from (c-4) a nonionic monomer in addition to the constitutional units derived from the monomers (c-1) and (c-2).

<18> The water-based ink for ink-jet printing as described in the above aspect <17>, wherein the ionic monomer is preferably an anionic monomer, more preferably a carboxylic acid monomer and even more preferably acrylic acid or methacrylic acid.

<19> The water-based ink for ink-jet printing as described in the above aspect <17> or <18>, wherein the hydrophobic monomer is preferably an alkyl (meth)acrylate or an aromatic group-containing monomer.

<20> The water-based ink for ink-jet printing as described in the above aspect <19>, wherein the aromatic group-containing monomer is preferably a vinyl monomer containing an aromatic group having 6 to 22 carbon atoms which may contain a substituent group having a hetero atom, and more preferably a styrene-based monomer or an aromatic group-containing (meth)acrylate.

<21> The water-based ink for ink-jet printing as described in any one of the above aspects <17> to <20>, wherein the macromonomer is preferably an aromatic group-containing monomer-based macromonomer or a silicone-based macromonomer, and more preferably an aromatic group-containing monomer-based macromonomer.

<22> The water-based ink for ink-jet printing as described in any one of the above aspects <1> to <21>, wherein a content of the pigment in the water-based ink is preferably not less than 1.0% by mass, more preferably not less than 2.0% by mass and even more preferably not less than 2.5% by mass, and is also preferably not more than 15% by mass, more preferably not more than 10% by mass and even more preferably not more than 7% by mass.

<23> The water-based ink for ink-jet printing as described in any one of the above aspects <16> to <22>, wherein a content of the pigment-containing water-insoluble polymer particles in the water-based ink is preferably not less than 1% by mass, more preferably not less than 3% by mass and even more preferably not less than 4% by mass, and is also preferably not more than 20% by mass, more preferably not more than 10% by mass and even more preferably not more than 8% by mass.

<24> The water-based ink for ink-jet printing as described in any one of the above aspects <16> to <23>, wherein a content of the water-insoluble polymer in the water-based ink is preferably not less than 0.5% by mass, more preferably not less than 0.8% by mass and even more preferably not less than 1.0% by mass, and is also preferably not more than 6% by mass, more preferably not more than 4% by mass and even more preferably not more than 3% by mass.

<25> The water-based ink for ink-jet printing as described in any one of the above aspects <1> to <24>, wherein viscosity of the water-based ink for ink-jet printing as measured at 32° C. is preferably not less than 2.0 mPa·s, more preferably not less than 3.0 mPa·s and even more preferably not less than 4.0 mPa·s, and is also preferably not more than 12 mPa·s, more preferably not more than 10.0 mPa·s, even more preferably not more than 8.0 mPa·s and further even more preferably not more than 7.0 mPa·s.

<26> The water-based ink for ink-jet printing as described in any one of the above aspects <1> to <25>, wherein a surface tension of the water-based ink for ink-jet printing is preferably not less than 25.0 mN/m, more preferably not less than 26.0 mN/m and even more preferably not less than 26.5 mN/m, and is also preferably not more than 30.0 mN/m, more preferably not more than 29.0 mN/m and even more preferably not more than 28.5 mN/m.

<27> An ink-jet printing method for printing images or characters on a recording medium using a water-based ink for ink-jet printing, in which the water-based ink is the water-based ink as described in any one of the above aspects <1> to <26>, and a water absorption of the recording medium is not less than 0 g/m$^2$ and not more than 10 g/m$^2$ as measured in a pure water contact time of 100 ms.

<28> The ink-jet printing method as described in the above aspect <27>, wherein a water absorption of the recording medium as measured in a pure water contact time of 100 ms is preferably not less than 1.0 g/m$^2$, more preferably not less than 2.0 g/m$^2$, even more preferably not less than 3.0 g/m$^2$ and further even more preferably not less than 4.0 g/m$^2$, and is also preferably not more than 8.0 g/m$^2$, more preferably not more than 7.0 g/m$^2$, even more preferably not more than 6.0 g/m$^2$ and further even more preferably not more than 5.5 g/m$^2$.

<29> The ink-jet printing method as described in the above aspect <27> or <28>, wherein said method comprises the steps of loading the water-based ink for ink-jet printing to an ink-jet printing apparatus equipped with an ink ejecting means; and ejecting the ink onto the recording medium to print images or characters thereon.

<30> The ink-jet printing method as described in the above aspect <29>, wherein the ink ejecting means includes a thermal-type or piezoelectric-type ink-jet head, preferably a piezoelectric-type ink-jet head, for ejecting the ink therethrough.

<31> The ink-jet printing method as described in the above aspect <29> or <30>, wherein said method comprises the steps of printing images or characters on the recording medium for ink-jet printing and then drying the printed images or characters.

<32> An image forming method including the steps of:
mounting a container filled with the water-based ink for ink-jet printing as described in any one of the above aspects <1> to <26> to an ink-jet printing apparatus equipped with an ink ejecting means; and
ejecting the ink onto a recording medium having a water absorption of not less than 0 g/m$^2$ and not more than 10 g/m$^2$ as measured in a pure water contact time of 100 ms to print images or characters thereon.

EXAMPLES

The present invention will be described in more detail below by referring to the following examples, etc. In the following examples, etc., the respective properties were measured by the following methods. Meanwhile, the "part(s)" and "%" indicate "part(s) by mass" and "% by mass", respectively, unless otherwise specified.

(1) Measurement of Weight-Average Molecular Weight of Water-Insoluble Polymer

The weight-average molecular weight of the polymer was measured by gel permeation chromatography [GPC apparatus: "HLC-8120GPC" available from Tosoh Corp.; column: "TSK-GEL α-M"×2 available from Tosoh Corp.; flow rate: 1 mL/min)] using N,N-dimethyl formamide in which phosphoric acid and lithium bromide were dissolved in amounts of 60 mmol/L and 50 mmol/L, respectively, as an eluent, and using a polystyrene as a reference standard substance.

(2) Measurement of Solid Content of Water Dispersion of Pigment-Containing Water-Insoluble Polymer Particles Ten grams (10.0 g) of sodium sulfate dried to constant weight in a desiccator were weighed and charged in a 30 mL ointment container, and about 1.0 g of a sample was added to the container. The contents of the container were mixed and then accurately weighed. The resulting mixture was held in the container at 105° C. for 2 h to remove volatile components therefrom and further allowed to stand in a desiccator for 15 min to measure the mass thereof. The mass of the sample after removing the volatile components therefrom was regarded as the mass of solids therein. The solid content of the sample was calculated by dividing the mass of the solids by the mass of the sample added.

(3) Measurement of Average Particle Size of Pigment-Containing Water-Insoluble Polymer Particles The average particle size of the particles was measured using a laser particle analyzing system (available from Otsuka Electronics Co., Ltd.; Model No.: "ELS-8000"; cumulant analysis). In the measurement, there was used the dispersion diluted with water such that the concentration of the particles therein was about $5 \times 10^{-3}\%$ by mass. The measurement was conducted at a temperature of 25° C., an angle between incident light and detector of 90° and a cumulative frequency of 100 times, and a refractive index of water (1.333) was input to the analyzing system as a refractive index of the dispersing medium.

(4) Measurement of Surface Tension of Water-Based Ink for Ink-Jet Printing

A platinum plate was dipped in a cylindrical polyethylene container (3.6 cm in diameter×1.2 cm in depth) filled with 5 g of the ink adjusted to 20° C. to measure the surface tension of the ink using a surface tension meter "CBVP-Z" available from Kyowa Interface Science Co., Ltd., by a Wilhelmy method.

(5) Measurement of Viscosity of Water-Based Ink for Ink-Jet Printing

The viscosity of the ink was measured at 32° C. using an E-type viscometer "TV-25" (equipped with a standard cone rotor (1° 34'×R24); rotating speed: 50 rpm) available from Toki Sangyo Co., Ltd.

(6) pH of Water-Based Ink for Ink-Jet Printing

The pH value of the ink was measured at 25° C. using a bench-top pH meter "F-71" available from Horiba Ltd., equipped with a pH electrode "6337-10D" available from Horiba Ltd.

(7) Water Absorption of Recording Medium for Ink-Jet Printing as Measured in Pure Water Contact Time of 100 ms Using an automatic scanning liquid absorptometer "KM500win" available from Kumagai Riki Kogyo Co., Ltd., the amount of pure water transferred to a recording medium when contacting the recording medium with pure water for 100 ms was measured at 23° C. under a relative humidity of 50%. The thus measured amount of pure water transferred to the recording medium was determined as a water absorption of the recording medium as measured in a pure water contact time of 100 ms. The measuring conditions are shown below.

"Spiral Method"
Contact time: 0.010 to 1.0 (sec)
Pitch (mm): 7
Length Per Sampling (degree): 86.29
Start Radius (mm): 20
End Radius (mm): 60
Min Contact Time (ms): 10
Max Contact Time (ms): 1000
Sampling Pattern (1-50): 50
Number of Sampling Points (>0): 19
"Square Head"
Split Span (mm): 1
Split Width (mm): 5

Production Example 1

Production of Water Dispersion of Pigment-Containing Water-Insoluble Polymer Particles (1) Synthesis of Water-Insoluble Polymer Forty six (46) parts of styrene (available from Wako Pure Chemical Industries, Ltd.), 14 parts of methacrylic acid (available from Wako Pure Chemical Industries, Ltd.), 30 parts of a styrene macromonomer "AS-6S" (available from Toagosei Co., Ltd.; molecular weight: 6000; solid content: 50%) and 50 parts of polypropylene glycol methacrylate "BLEMMER PP-1000" (available from NOF Corp.) were mixed to prepare 140 parts of a monomer mixture solution.

Eighteen (18) parts of methyl ethyl ketone and 0.03 part of 2-mercaptoethanol as a chain transfer agent as well as 10% (14 parts) of the monomer mixture solution prepared above were charged into a reaction vessel and mixed with each other, and then an inside atmosphere of the reaction vessel was fully replaced with a nitrogen gas.

Separately, a mixed solution prepared by mixing the remaining 90% (126 parts) of the monomer mixture solution, 0.27 part of the above chain transfer agent, 42 parts of methyl ethyl ketone and 3 parts of a polymerization initiator 2,2'-azobis(2,4-dimethylvaleronitrile) "V-65" (available from Wako Pure Chemical Industries, Ltd.) was charged into a dropping funnel. In a nitrogen atmosphere, the mixed solution in the reaction vessel was heated to 75° C. while stirring, and then the mixed solution in the dropping funnel was added dropwise thereinto over 3 h. After the elapse of 2 h from completion of the dropwise addition while maintaining the resulting mixed solution at a temperature of 75° C., a solution prepared by dissolving 3 parts of the above polymerization initiator in 5 parts of methyl ethyl ketone was added to the mixed solution, and the resulting reaction solution was further aged at 75° C. for 2 h and at 80° C. for 2 h to obtain a water-insoluble polymer solution (weight-average molecular weight: 100,000). The solid content of the water-insoluble polymer solution was 60% by mass.

(2) Production of Water Dispersion of Pigment-Containing Water-Insoluble Polymer Particles Sixty six (66) parts of the water-insoluble polymer produced by drying the water-insoluble polymer solution obtained in the above (1) under reduced pressure were dissolved in 148 parts of methyl ethyl ketone. Added into the resulting solution were 18.8 parts of a 5N sodium hydroxide aqueous solution and 2 parts of a 25% ammonia aqueous solution as neutralizing agents, and 372 parts of ion-exchanged water, and then 100 parts of a cyan pigment "CFB-6338JC" (available from Dainichiseika Color & Chemicals Mfg. Co., Ltd.) were added to the resulting mixed solution to prepare a pigment mixture solution. The degree of neutralization of the pigment mixture solution was 100 mol %. The thus obtained pigment mixture solution was mixed at 20° C. for 1 h using a disper blade at 7000 rpm. The resulting dispersion was dispersed under a pressure of 180 MPa using a Microfluidizer "High-Pressure Homogenizer M-140K" (available from Microfluidics Corp.) by passing through the device 15 times.

The obtained dispersion of the water-insoluble polymer particles was placed at 60° C. under reduced pressure to remove methyl ethyl ketone therefrom, followed by further removing a part of water therefrom. The resulting dispersion was subjected to centrifugal separation, and a liquid layer portion separated therefrom was filtered through a filter "Minisart Syringe Filter" (available from Sartorius Inc.; pore diameter: 5 µm; material: acetyl cellulose) to remove coarse particles therefrom, thereby obtaining a water dispersion of pigment-containing water-insoluble polymer particles. The solid content of the water dispersion was 20% by mass, and the average particle size of the pigment-containing water-insoluble polymer particles was 100 nm.

Examples 1 to 11 and Comparative Examples 1 to 11

Production of Water-Based Inks

The additives in predetermined amounts as shown in Table 1, 25. 3 parts of the water dispersion of the pigment-containing water-insoluble polymer particles (solid content: 20% by mass; pigment: 3.04 parts; water-insoluble polymer: 2.03 parts), 10 parts of glycerin and 25 parts of diethylene glycol were mixed with each other, and further ion-exchanged water was added to the resulting mixture such that the total volume thereof was 100 parts. The resulting mixed solution was filtered through a filter "Minisart Syringe Filter" (available from Sartorius Inc.; pore diameter: 1.2 µm; material: acetyl cellulose) to prepare water-based inks having a pH value of 8.8.

Properties of the thus obtained water-based inks are shown in Tables 1 and 2, and compounds used for producing the water-based inks are shown in Table 4.

Examples 12 to 14 and Comparative Examples 12 to 14

Production of Water-Based Inks

The same procedure as in Example 1 was repeated except for using the respective pigments shown in Table 3 in place of the water dispersion of the pigment-containing water-insoluble polymer particles, thereby obtaining water-based inks having a pH value of 8.8.

Properties of the thus obtained water-based inks are shown in Table 3, and compounds used for producing the water-based inks are shown in Table 4.

Meanwhile, the details of the pigments shown in Table 3 are as follows.

Encapsulated Pigment (Bk): Carbon black pigment "MONARCH800" available from Cabot Corp., was used in place of the cyan pigment used in Production Example 1(2).

Encapsulated Pigment (M): Magenta pigment "PR-122" available from Dainichiseika Color & Chemicals Mfg. Co., Ltd., was used in place of the cyan pigment used in Production Example 1(2).

Encapsulated Pigment (Y): Yellow pigment "PY-74" available from Dainichiseika Color & Chemicals Mfg. Co., Ltd., was used in place of the cyan pigment used in Production Example 1(2).

Self-Dispersed Carbon: Self-dispersed carbon "cab-o-jet-300" available from Cabot Corp., was used in place of the pigment-containing water-insoluble polymer particles.

Self-Dispersed Organic Pigment (C): Self-dispersed organic pigment "cab-o-jet-260M" available from Cabot Corp., was used in place of the pigment-containing water-insoluble polymer particles.

Water-Soluble Dispersant Pigment (C): Water-soluble polymer "JONCRYL 61J" available from BASF was used in place of the water-insoluble polymer used in Production Example 1(2).

<Evaluation Test of Water-Based Ink>

The following experiments 1 to 4 were carried out. The results are shown in Tables 1 to 3.

Experiment 1

Evaluation of Image Unevenness (MOTTLING)

The water-based ink produced in the respective Examples and Comparative Examples was loaded to a printing evaluation apparatus (available from Trytech Co., Ltd.) equipped with an ink-jet head "KJ4B-HD06MHG-STDV" (available from Kyocera Corp.) under the environmental conditions of a temperature of 25±1° C. and a relative humidity of 30±5%.

The operating conditions set of the apparatus were a head voltage of 26 V, a frequency of 30 kHz, an ejected ink droplet amount of 12 pL, a head temperature of 32° C., a resolution of 600 dpi, a number of ink shots for flashing before ejection of 200 shots, and a negative pressure of −4.0 kPa.

The recording medium was fixed on a transporting table under reduced pressure such that the length direction of the recording medium was aligned with the transporting direction thereof.

A printing command was transmitted to the printing evaluation apparatus to print a solid image of Duty 100% (12 pL; 600×600 dpi) on the following recording media 1 to 4 by an ink-jet printing method using the water-based ink, thereby obtaining printed matters.

Recording medium 1: Gloss coated paper "OK Topcoat+" (available from Oji Paper Co., Ltd.); A4 size; water absorption: 4.9 g/m$^2$ Recording medium 2: Gloss coated paper "UPM Finesse Gloss" (available from UPM Kymmene Oyj; A4 size; water absorption: 3.1 g/m$^2$ Recording medium 3: Matte coated paper "UPM Finesse Matt" (available from UPM Kymmene Oyj; A4 size; water absorption: 4.4 g/m$^2$ Recording medium 3: Silk coated paper "TerraPress Silk" (available from Stora Enso); A4 size; water absorption: 4.1 g/m$^2$ The printed portions of the thus obtained printed matters were observed by the naked eyes to examine whether or not any image unevenness (MOTTLING) occurred, and the image unevenness (MOTTLING) of the ink was evaluated according to the following ratings. The larger evaluation value indicates a less image unevenness (MOTTLING) and therefore a more excellent result. The results are shown in Table 2.

(Evaluation Ratings of Image Unevenness (MOTTLING))

4: No image unevenness (MOTTLING) was observed on any of the 4 kinds of recording media evaluated.

3: Image unevenness (MOTTLING) was observed on one of the 4 kinds of recording media evaluated.

2: Image unevenness (MOTTLING) was observed on two of the 4 kinds of recording media evaluated.

1: Image unevenness (MOTTLING) was observed on three of the 4 kinds of recording media evaluated.

0: Image unevenness (MOTTLING) was observed on all of the 4 kinds of recording media evaluated.

Experiment 2

Evaluation of Turbidity of Ink

The ink produced was allowed to stand at 25° C. for 1 h, and then observed by the naked eyes to examine whether or not any defects such as oily tinting, phase separation, white turbidity or the like were caused.

Experiment 3

Evaluation of Storage Stability

The ink was filled in a closed container and stored in a thermostatic chamber at 70° C. for one week. The ink was measured for its viscosity at 32° C. before and after stored by the above measuring method to calculate a rate of change in viscosity thereof from the formula: (viscosity after stored)/(viscosity before stored)×100(%).

As the value of the rate of change in viscosity of the ink is closer to 100%, the ink is more excellent in storage stability. If the storage stability lies within 120%, the ink can be practically used, and the storage stability value of the ink preferably lies within 110%.

Experiment 4

Evaluation of Ejection Property

Under the same printing conditions as in Experiment 1, 40 sheets of the recording medium 1 were continuously printed, and the obtained printed sheets were observed by the naked eyes at the 1st sheet and every 10 sheets to examine whether or not any defects such as "slippage", "lacks" and "sprays" were caused, and the ejection property of the ink was evaluated according to the following ratings.

The larger evaluation value indicates a more excellent ejection property. When the ejection property of the ink is on a level 3 or higher, the ink can be practically used, and the ink preferably has an ejection property of a level 4 or higher.

(Evaluation Ratings of Ejection Property)

5: Neither "slippage", "lacks" nor "sprays" occurred even at the 40th printed sheet.

4: "Slippage", "lacks" or "sprays" occurred before reaching the 40th printed sheet.

3: "Slippage", "lacks" or "sprays" occurred before reaching the 30th printed sheet.

2: "Slippage", "lacks" or "sprays" occurred before reaching the 20th printed sheet.

1: "Slippage", "lacks" or "sprays" occurred before reaching the 10th printed sheet.

0: "Slippage", "lacks" or "sprays" occurred at the 1st printed sheet.

In the above ratings, "slippage" means that the ink is ejected, but the ejection direction of the ink is unstable so that the printed matter suffers from occurrence of white streaks; "lacks" mean that there is present any nozzles from which no ink was ejected, and therefore thick white streaks occur on the printed matter; and "sprays" mean that the ink is sprayed from nozzles in the form of a mist so that a recording medium printed is stained.

TABLE 1

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Component (A) | | | | | | | | | | | |
| Acetylene glycol | 1.0 | 1.5 | 2.0 | 1.5 | 1.5 | 1.5 | 1.5 | 1.0 | 1.0 | 3.0 | 3.0 |
| Other components | | | | | | | | | | | |
| Additive a1 | — | — | — | — | — | — | — | — | — | — | — |
| Additive a2 | — | — | — | — | — | — | — | — | — | — | — |
| Component (B) | | | | | | | | | | | |
| Nonionic surfactant 1 | 2.0 | 3.0 | 4.0 | — | — | — | — | 1.0 | 3.0 | 3.0 | 9.0 |
| Nonionic surfactant 2 | — | — | — | 3.0 | — | — | — | — | — | — | — |
| Nonionic surfactant 3 | — | — | — | — | 3.0 | 4.5 | — | — | — | — | — |
| Nonionic surfactant 4 | — | — | — | — | 3.0 | — | — | — | — | — | — |
| Other components | | | | | | | | | | | |
| Additive b1 | — | — | — | — | — | — | — | — | — | — | — |
| Additive b2 | — | — | — | — | — | — | — | — | — | — | — |
| Mass ratio [component (B)/component (A)] | 2 | 2 | 2 | 2 | 2 | 2 | 3 | 1 | 3 | 1 | 3 |
| Properties of ink | | | | | | | | | | | |
| Surface tension (mN/m) | 28.0 | 27.5 | 27.0 | 27.5 | 27.5 | 27.5 | 27.5 | 28.0 | 28.0 | 28.0 | 28.0 |
| Viscosity (mPa · s) | 5.0 | 5.5 | 6.5 | 7.0 | 5.6 | 5.4 | 6.2 | 4.5 | 5.3 | 7.5 | 9.0 |
| Evaluation of ink | | | | | | | | | | | |
| Image unevenness (MOTTLING) | 3 | 4 | 4 | 4 | 4 | 4 | 4 | 3 | 3 | 4 | 4 |

TABLE 1-continued

|  | Examples | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Turbidity of ink | None | None | None | None | None | None | None | * | None | * | None |
| Storage stability | 101% | 102% | 103% | 98% | 102% | 101% | 107% | 102% | 103% | 110% | 120% |
| Ejection property | 5 | 5 | 5 | 5 | 5 | 5 | 4 | 5 | 4 | 4 | 3 |

Note
*: "Emulsified"; this means such a condition that the ink was slightly whitely turbid.

TABLE 2

|  | Comparative Examples | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Component (A) | | | | | | | | | | | |
| Acetylene glycol | 1.5 | — | 1.5 | 1.5 | 0.8 | 3.2 | — | — | — | 1.5 | 1.5 |
| Other components | | | | | | | | | | | |
| Additive a1 | — | — | — | — | — | — | — | 2.0 | 2.0 | — | — |
| Additive a2 | — | — | — | — | — | — | 1.5 | — | — | — | — |
| Component (B) | | | | | | | | | | | |
| Nonionic surfactant 1 | — | 3.0 | — | 5.0 | 1.0 | 4.0 | 3.0 | — | 3.0 | — | — |
| Nonionic surfactant 2 | — | — | — | — | — | — | — | — | — | — | — |
| Nonionic surfactant 3 | — | — | 0.5 | — | — | — | — | — | — | — | — |
| Nonionic surfactant 4 | — | — | — | — | — | — | — | — | — | — | — |
| Other components | | | | | | | | | | | |
| Additive b1 | — | — | — | — | — | — | — | — | — | — | 3.0 |
| Additive b2 | — | — | — | — | — | — | — | — | — | 3.0 | — |
| Mass ratio [component (B)/component (A)] | — | — | 0.3 | 3.3 | 1.3 | 1.3 | — | — | — | — | — |
| Properties of ink | | | | | | | | | | | |
| Surface tension (mN/m) | 27.5 | 32 | 27.5 | 27.5 | 28.5 | 27 | 32 | 28.0 | 28.0 | 27.5 | 27.5 |
| Viscosity (mPa·s) | 4.7 | 5.2 | 4.9 | 7.5 | 4.3 | 7.5 | 5.5 | 5.0 | 6.0 | 5.5 | 5.5 |
| Evaluation of ink | | | | | | | | | | | |
| Image unevenness (MOTTLING) | 1 | 0 | 1 | 2 | 1 | Not evaluable | 0 | 1 | 1 | 1 | 1 |
| Turbidity of ink | ** | None | ** | None | * | * | ** | None | None | ** | ** |
| Storage stability | 115% | 102% | 120% | 120% | 103% | 180% | 125% | 101% | 103% | 130% | 135% |
| Ejection property | 1 | 5 | 1 | 4 | 5 | 0 | 1 | 5 | 2 | 1 | 1 |

Note
*: "Emulsified"; this means such a condition that the ink was slightly whitely turbid;
**: Phase separation

TABLE 3

|  | Examples | | | | | | Comparative Examples | | |
| --- | --- | --- | --- | --- | --- | --- | --- | --- | --- |
|  | 12 | 13 | 14 | 15 | 16 | 17 | 12 | 13 | 14 |
| Pigment | | | | | | | | | |
| Encapsulated pigment (Bk) | 4.0 | — | — | — | — | — | — | — | — |
| Encapsulated pigment (M) | — | 5.0 | — | — | — | — | — | — | — |
| Encapsulated pigment (Y) | — | — | 3.0 | — | — | — | — | — | — |
| Self-dispersed carbon | — | — | — | 4.0 | — | — | 4.0 | — | — |
| Self-dispersed organic pigment (C) | — | — | — | — | 3.0 | — | — | 3.0 | — |
| Water-soluble dispersant pigment (C) | — | — | — | — | — | 3.0 | — | — | 3.0 |

TABLE 3-continued

|  | Examples | | | | | | Comparative Examples | | |
| --- | --- | --- | --- | --- | --- | --- | --- | --- | --- |
|  | 12 | 13 | 14 | 15 | 16 | 17 | 12 | 13 | 14 |
| Component (A) | | | | | | | | | |
| Acetylene glycol | 1.5 | 1.5 | 1.5 | 1.5 | 1.5 | 1.5 | 1.5 | 1.5 | 1.5 |
| Other components | | | | | | | | | |
| Additive a1 | — | — | — | — | — | — | — | — | — |
| Additive a2 | — | — | — | — | — | — | — | — | — |
| Component (B) | | | | | | | | | |
| Nonionic surfactant 1 | 3.0 | 3.0 | 3.0 | 3.0 | 3.0 | 3.0 | — | — | — |
| Nonionic surfactant 2 | — | — | — | — | — | — | — | — | — |
| Nonionic surfactant 3 | — | — | — | — | — | — | — | — | — |
| Nonionic surfactant 4 | — | — | — | — | — | — | — | — | — |
| Other components | | | | | | | | | |
| Additive b1 | — | — | — | — | — | — | — | — | — |
| Additive b2 | — | — | — | — | — | — | — | — | — |
| Mass ratio [component (B)/component (A)] | 2 | 2 | 2 | 2 | 2 | 2 | — | — | — |
| Properties of ink | | | | | | | | | |
| Surface tension (mN/m) | 27.5 | 27.5 | 27.5 | 27.1 | 27.3 | 27.4 | 27.5 | 27.5 | 27.5 |
| Viscosity (mPa · s) | 5.7 | 5.8 | 5.4 | 4.8 | 4.9 | 5.8 | 4.5 | 4.6 | 4.8 |
| Evaluation of ink | | | | | | | | | |
| Image unevenness (MOTTLING) | 4 | 4 | 4 | 3 | 4 | 3 | 1 | 1 | 1 |
| Turbidity of ink | None | None | None | None | None | None | ** | ** | ** |
| Storage stability | 101% | 102% | 103% | 110% | 115% | 109% | 130% | 125% | 115% |
| Ejection property | 5 | 5 | 5 | 5 | 5 | 5 | 1 | 1 | 1 |

Note
**: Phase separation

TABLE 4

| | Chemical structure |
| --- | --- |
| Component (A) | |
| Acetylene glycol | 2,4,7,9-Tetramethyl-5-decyne-4,7-diol*[1] |
| Other components | |
| Additive a1 | Adduct of 2,4,7,9-tetramethyl-5-decyne-4,7-diol with 10 mol of ethyleneoxide*[2] |
| Additive a2 | Compound of formula (1) wherein R = lauryl; m = 0; n = 5*[3] |
| Component (B) | |
| Nonionic surfactant 1 | Compound of formula (1) wherein R = lauryl; m = 12*[4] |
| Nonionic surfactant 2 | Compound of formula (1) wherein R = lauryl; m = 50*[4] |
| Nonionic surfactant 3 | Compound of formula (1) wherein R = oleyl; m = 12*[4] |
| Nonionic surfactant 4 | Compound of formula (1) wherein R = octyldodecyl; m = 20*[4] |
| Other components | |
| Additive b1 | Compound of formula (1) wherein R = butyl; m = 3*[5] |
| Additive b2 | Butanol*[5] |

Note
*[1]"SURFYNOL 104PG-50" available from Nissin Chemical Industry Co., Ltd.; content: 50% by mass
*[2]"SURFYNOL 465" available from Nissin Chemical Industry Co., Ltd.; content: 100% by mass
*[3]Available from Kao Corp.
*[4]"EMULGEN" series available from Kao Corp.
*[5]Guaranteed regents available from Wako Pure Chemical Industries, Ltd.

The water-based inks obtained in Examples 1 to 11 as shown in Table 1 were free from image unevenness (MOTTLING) and turbidity or suffered from much less image unevenness (MOTTLING) and much less turbidity when printed on a low-water absorbing recording medium, exhibited a good storage stability and a good ejection property with a practically usable level or higher. Therefore, it was confirmed that these inks were excellent.

On the other hand, as shown in Table 2, the ink containing 1.5% by mass of 2,4,7,9-tetramethyl-5-decyne-4,7-diol (Comparative Example 1) suffered from turbidity and image unevenness (MOTTLING). Also, the ink containing the nonionic surfactant only (Comparative Example 2) was unable to be improved in image unevenness (MOTTLING).

The ink containing 2,4,7,9-tetramethyl-5-decyne-4,7-diol in an amount of less than 1% by mass (Comparative Example 5; 0.8% by mass) was unable to be improved in image unevenness (MOTTLING).

The ink containing 2,4,7,9-tetramethyl-5-decyne-4,7-diol in an amount exceeding 3% by mass (Comparative Example 6; 3.2% by mass) was unable to be ejected in an ink-jet manner, and therefore evaluation for printability of the ink was not possible.

The ink containing a less amount of the nonionic surfactant added and therefore having a mass ratio [(B)/(A)] of less than 1 (Comparative Example 3; 0.3) was unable to be improved in not only turbidity but also image unevenness (MOTTLING). The ink containing a large amount of the nonionic surfactant added and therefore having a mass ratio [(B)/(A)] of more than 3 (Comparative Example 4; 3.3) was slightly improved in turbidity, but was unable to be improved in image unevenness (MOTTLING).

The ink containing 2% by mass of an ethyleneoxide adduct of 2,4,7,9-tetramethyl-5-decyne-4,7-diol (Comparative Example 8) was free from turbidity, but was deteriorated in effect of improving image unevenness (MOTTLING) thereof. Also, even the ink further containing the nonionic surfactant in addition to the ethyleneoxide adduct (Comparative Example 9) did not have improved image unevenness (MOTTLING).

The inks of Comparative Examples 10 and 11 which were those used in Examples of JP 2005-154549A suffered from turbidity and image unevenness (MOTTLING) and had deteriorated ejection properties.

As described above, the water-based inks obtained in Examples 1 to 11 were free from image unevenness (MOTTLING) and turbidity when printed on a low-water absorbing recording medium and exhibited a good storage stability and a good ejection property with a practically usable level or higher, and therefore were excellent as compared to the inks obtained in Comparative Examples 1 to 11.

In addition, as shown in Table 3, the water-based inks obtained in Examples 12 to 17 were free from image unevenness (MOTTLING) and turbidity when printed on a low-water absorbing recording medium and exhibited a good storage stability and a good ejection property with a practically usable level or higher, and therefore were excellent as compared to the inks obtained in Comparative Examples 12 to 14. For this reason, it was confirmed that the ink-jet printing method according to the present invention can be practiced in extensive applications using the water-based ink for ink-jet printing containing various pigments.

INDUSTRIAL APPLICABILITY

The ink-jet printing method according to the present invention is free from turbidity of the ink and excellent in effect of suppressing image unevenness (MOTTLING) when printed on a low-water absorbing recording medium as well as storage stability and ejection property of the ink. Therefore, the ink-jet printing method according to the present invention can be suitably used in extensive applications.

The invention claimed is:

1. An ink-jet printing method for printing images or characters on a recording medium using a water-based ink for ink-jet printing, wherein
the water-based ink comprises:
at least one acetylene glycol (A) selected from the group consisting of 2,4,7,9-tetramethyl-5-decyne-4,7-diol, 3,6-dimethyl-4-octyne-3,6-diol and 2,5-dimethyl-3-hexyne-2,5-diol;
a nonionic surfactant (B);
a pigment; and
water, wherein
the nonionic surfactant (B) is a compound represented by the general formula (1):

RO-[(EO)$m$/(PO)$n$]-H      (1)

wherein R is a hydrocarbon group having not less than 12 and not more than 24 carbon, EO is ethyleneoxy group, PO is a propylene oxy group, m is a number of from 10 to 60, and n is a number 0;
a content of the component (A) in the water-based ink is not less than 1.0% by mass and not more than 3.0% by mass, and a mass ratio of the component (B) to the component (A) (B/A) is not less than 1 and not more than 3; and
the recording medium has a water absorption of not less than 0 g/m$^2$ and not more than 10 g/m$^2$ as measured in a pure water contact time of 100 ms.

2. The ink-jet printing method according to claim 1, wherein a content of the nonionic surfactant (B) in the water-based ink is not less than 1.0% by mass and not more than 9.0% by mass.

3. The ink-jet printing method according to claim 1, wherein the pigment contained in the water-based ink is in the form of a self-dispersible pigment, a dispersant-dispersed pigment or pigment-containing water-insoluble polymer particles.

4. The ink-jet printing method according to claim 1, wherein the pigment contained in the water-based ink is in the form of a pigment-containing water-insoluble polymer particles.

5. The ink jet printing method according to claim 1, wherein viscosity of the water-based ink for ink-jet printing as measured at 32° C. is not less than 2.0 mPa·s and not more than 12 mPa·s.

6. The ink-jet printing method according to claim 1, wherein a surface tension of the water-based ink for ink-jet printing is not less than 25.0 mN/m and not more than 30.0 mN/m.

7. An image forming method comprising the steps of:
mounting a container filled with a pigment-containing water-based ink for ink-jet printing to an ink-jet printing apparatus equipped with an ink ejecting means; and
ejecting the ink onto a recording medium having a water absorption of not less than 0 g/m$^2$ and not more than 10 g/m$^2$ as measured in a pure water contact time of 100 ms to print images or characters thereon, wherein
the water-based ink comprises:
at least one acetylene glycol (A) selected from the group consisting of 2,4,7,9-tetramethyl-5-decyne-4,7-diol, 3,6-dimethyl-4-octyne-3,6-diol and 2,5-dimethyl-3-hexyne-2,5-diol; and
a nonionic surfactant (B), wherein
the nonionic surfactant (B) is a compound represented by the general formula (1):

RO-[(EO)$m$/(PO)$n$]-H      (1)

wherein R is a hydrocarbon group having not less than 12 and not more than 24 carbon, EO is ethyleneoxy group, PO is a propylene oxy group, m is a number of from 10 to 60, and n is a number 0; and
a content of the component (A) in the water-based ink is not less than 1.0% by mass and not more than 3.0% by mass, and a ratio of the component (B) to the component (A) (B/A) is not less than 1 and not more than 3.

8. The image forming method according to claim 7, wherein a content of the nonionic surfactant (B) in the water-based ink is not less than 1.0% by mass and not more than 9.0% by mass.

9. The image forming method according to claim 7, wherein the pigment contained in the water-based ink is in the form of a self-dispersible pigment, a dispersant-dispersed pigment or pigment-containing water-insoluble polymer particles.

10. The image forming method according to claim 7, wherein the pigment contained in the water-based ink is in the form of a pigment-containing water-insoluble polymer particles.

11. The image forming method according to claim 7, wherein viscosity of the water-based ink for ink-jet printing as measured at 32° C. is not less than 2.0 mPa·s and not more than 12 mPa·s.

12. The image forming method according to claim 7, wherein a surface tension of the water-based ink for ink-jet printing is not less than 25.0 mN/m and not more than 30.0 mN/m.

* * * * *